United States Patent [19]
Gavrilescu et al.

[11] 3,876,783
[45] Apr. 8, 1975

[54] METHOD OF AND COMPOSITION FOR THE TREATMENT OF ACUTE INTOXICATION
[75] Inventors: Stefan Gavrilescu; Caius Streian; Tiberiu Danciu, all of Timisoara, Romania
[73] Assignee: Institutul De Medicina Timisoara, Timisoara, Romania
[22] Filed: Feb. 25, 1972
[21] Appl. No.: 229,552

[30] Foreign Application Priority Data
Feb. 27, 1971 Romania................................ 66092

[52] U.S. Cl. ................. 424/247; 424/313; 424/325
[51] Int. Cl............................................. A61k 27/00
[58] Field of Search..................... 424/247, 313, 325

[56] References Cited
UNITED STATES PATENTS
3,055,805   9/1962   Nahas................................ 424/325

OTHER PUBLICATIONS
Chemical Abstracts, Vol. 53, 4455–4456, (1959), Vol. 64, 8304, (1966).
Remington's Pharmaceutical Sciences, Mack Pub. Co., Easton, Penna/1965, page 1407.

Primary Examiner—Frederick E. Waddell
Attorney, Agent, or Firm—Karl F. Ross; Herbert Dubno

[57] ABSTRACT

A composition for the treatment of acute alcohol intoxication by promoting the metabolic reduction of the alcohol level in the system comprising 0.2 percent by weight of tetramethylthyonine chloride, about 2.5 percent by weight 2-amino -2-hydroxymethylene-1,3-propanediol-aspartate and 3.5 percent by weight 2-amino-2hydroxy-methylene-1,3-propanediol, to which up to 10 percent sorbit may be added, is disclosed along with a method of using same.

4 Claims, No Drawings

METHOD OF AND COMPOSITION FOR THE TREATMENT OF ACUTE INTOXICATION

The present invention relates to a drug for rapidly lowering an elevated blood alcohol level and reducing the clinical and metabolic consequences of alcohol intoxication. The composition contains substances exerting enzymatic action on the metabolic degradation of ethyl alcohol, and having a protective effect on tissues with suffering intense metabolism.

In the treatment of acute alcoholism, which is a serious illness with grave clinical manifestations, such as coma or cardiac arrest, associated with metabolic disturbances, the following drugs are commonly used: tetraethyl disulphide and calcium carbamide, sedatives of the phenothiazinic type, supportive medication of the cardiovascular system, diuretics, stimulants of the central nervous system, vitamins and symptomatic drug. The remission of the clinical signs and symptoms including lowering of the alcoholemia, with habitual medication, is prolonged. The control of an alcoholic coma with such, takes 12–36 hours.

One of the disadvantages of the commonly used drugs in the treatment of acute alcoholism is, that they have no accelerating effect on the metabolization of ethyl alcohol and do not counteract the main pathogenic metabolic mechanism. These drugs have no specific effect and do not sufficiently prevent the possible complications of acute alcohol intoxication.

The afore common methods mentioned above, have general supportive effects and, in a much lesser degree, selective pharmacodynamic effect.

The present invention obviates the mentioned disadvantages, by the use of a composition which consists of a mixture (by weight) of substantially 0.2 percent tetramethylthyoninechloride, 2.5 percent 2-amino-2-hydroxymethylene-1-3-propandiol-aspartate, 3.5 percent 2-amino-2-hydroxymethylene-1-3-propandiol (tris) and possibly 10 percent sorbit.

The following examples illustrate the invention:

EXAMPLE I

| | |
|---|---|
| Aspartic acid | 13.09 g |
| Tris | 47.91 g |
| Methylene blue | 2.00 g |
| Distilled water to | 1000.00 ml |

Six parts of the prescribed quantity of distilled water which contains all of the aspartic acid (with low solubility) is mixed with the remaining four parts of water in which the tris (high soluble) was dissolved.

The solution is filtered, bottled and sterilized under pressure at a temperature of 120 C° for 20 minutes.

EXAMPLE II

| | |
|---|---|
| Aspartic acid | 13.09 g |
| Tris | 47.91 g |
| Methylene blue | 2.00 g |
| Sorbit | 100.00 g |
| Distilled water to | 1000.00 ml |

The mode of preparation is the same as in Example I with the only difference being that sorbit is added.

The compositions are put up in bottles of 150 ml containing:

| | |
|---|---|
| Tris-aspartate | 3.75 g |
| Tris | 5.40 g |
| Methylene blue | 0.30 g |
| Sorbit | 0 or 15.00 g |
| Distilled water up to | 150.00 ml |

The mode of administration: intravenous by slow infusion. The pH of this solution is 7.5.

EXAMPLE III

| | |
|---|---|
| Tris-aspartate | 0.182 g |
| Tris | 0.270 g |
| Methylene blue | 0.015 g |

For one enteric coated capsule

The mode of administration: orally, 2–6 capsules according to the degree of alcoholic intoxication.

The composition promotes the enzymatic degradation of ethyl alcohol, accelerating this reaction, while enhancing the tricarboxylic acid cycle.

The drug thus accelerates the metabolism of ethyl alcohol and lowers the raised alcoholemia after the intravenous infusion of the solution.

Experimentally and in human beings it was found that elevated levels of ethyl alcohol in blood diminished in an hour at a 15–30 fold faster rate, as compared with the natural process of the breaking down of ethyl alcohol. The methylene blue is reduced enzymatically at the cellular level to the uncolored leucoderivate. The inverse processes, the oxidation of the leucoderivate is also possible, but being not an enzymatically determined one, it takes place slowly. The methylene blue and its reduced form represents a redox system which can accept electrons from any other redox system having a more negative potential. The methylene blue reduces the NADH accepting electrons from the reduced forms of cytochrome and flavoprotein. The reduction of the concentration of NADH has as consequence the diminution of the lactate production from pyruvate with a stabilizing effect on the equillibrium: pyruvic acid + NADH + H$^+$  LDH lactic acid + NAD4

Through its actions on cellular metabolism the methylene blue reduces anaerobic glycolysis favoring the aerobic glycolysis, and lowers the production of lactic acid. As a consequence the hypoxic tissular metabolism is ameliorated.

Ethyl alcohol induces metabolic modifications very similar to those realized by physical exercise and hypoxia, which interfere with the metabolic aerobic pathways and produce metabolic acidosis. The proposed drug corrects the said metabolic disturbances induced by alcohol.

Together with the methylene blue the tris-aspartate favors a better utilization of oxygen during hypoxia. A reduction of the oxygen supply at the cellular level has a limiting effect on the tricarboxylic acid cycle. Through the oxaloacetate which results from the deamination of aspartate, one of the limiting factors of the tricarboxylic acid cycle is removed on the other part a H$^{4+}$ acceptor is supplied, even if the oxygen supply is diminished or limited. The other effects of the tris-aspartate are the ammonia fixing properties and the promotion of intracellular protein synthesis. The action on the cellular enzymatic apparatus contribute to the enhancing and activating effect of the tris-aspartate on tissues with intense metabolism such as heart, liver, nervous system and striate muscular tissues. It was found also that the tris-aspartate has an inhibitory effect on the post-heparin plasma free-fatty acids increase. This effect may be useful during hypoxia.

The presence of tris in the composition of the drug is justified by the fact that it corrects the metabolic acidosis associated with alcohol intoxication without an addition of supplementary ions.

The composition has the following advantages:

It has rapid metabolic action and permits the control of alcoholic coma in 20–40 minutes, compared with 12–36 hours in the case of prior treatments.

When the patient wakes from the coma there is no period of psychomotor excitation which accompanies the conventional treatment.

It diminishes the seriousness of the illness and in the same time prevents the development of complications.

The drug may be used with efficacy in various illness which are associated with metabolic disturbances similar to the acute alcohol intoxication such as hypoxia, shock and metabolic acidosis.

The drug may be administered orally in the cases of lesser severity (without coma).

The composition, has the specific metabolic effect of breaking down the ethyl alcohol and the effect of correcting the metabolic disturbances which are the consequences of acute alcohol intoxication.

We claim:

1. A composition dissolved in distilled water for the treatment of alcoholic intoxication comprising: 0.2 percent by weight of tetramethylthyonine chloride, 2.5 percent by weight of 2-amino-2-hydroxymethylene-1,3-propanediol-aspartate, 3.5 percent by weight of 2-amino-2-hydroxymethylene-1,3-propanediol, and 0 to 10 percent by weight of sorbit.

2. A method of treating alcoholic intoxication in a patient comprising administering orally or intravenously to the patient a composition dissolved in distilled water comprising 0.2 percent by weight of tetramethylthyonine chloride, 2.5 percent by weight of 2-amino-2-hydroxymethylene-1,3-propanediol-aspartate, 3.5 percent by weight of 2-amino-2-hydroxymethylene-1,3-propanediol, and 0 to 10 percent by weight of sorbit for a period and in an amount sufficient to ameliorate the condition.

3. The method of claim 2 wherein said composition is administered by intravenous injections.

4. The method of claim 2 wherein said composition is orally administered in the form of capsules.

* * * * *